United States Patent
Zhang (10) Patent No.: US 12,342,275 B2
(45) Date of Patent: Jun. 24, 2025

(54) ENERGY SAVING MANAGEMENT METHOD AND APPARATUS

(71) Applicant: Huawei Technologies Co., Ltd., Shenzhen (CN)

(72) Inventor: Kai Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 466 days.

(21) Appl. No.: 17/663,349

(22) Filed: May 13, 2022

(65) Prior Publication Data

US 2022/0272627 A1    Aug. 25, 2022

Related U.S. Application Data (63) Continuation of application No. PCT/CN2019/118563, filed on Nov. 14, 2019.

(51) Int. Cl.
*H04W 52/02* (2009.01)
*H04W 24/08* (2009.01)
*H04W 24/10* (2009.01)

(52) U.S. Cl.
CPC ....... *H04W 52/0206* (2013.01); *H04W 24/08* (2013.01); *H04W 24/10* (2013.01)

(58) Field of Classification Search
CPC ............. H04W 52/0206; H04W 24/08; H04W 24/10; Y02D 30/70
USPC ......................................... 370/311; 455/312
See application file for complete search history.

(56) References Cited

U.S. PATENT DOCUMENTS

| | | | |
|---|---|---|---|
| 2012/0113882 A1 | 5/2012 | Zhao et al. | |
| 2013/0095842 A1 | 4/2013 | Jia et al. | |
| 2015/0319688 A1* | 11/2015 | Matas Sanz | H04W 52/0206 455/574 |
| 2015/0365946 A1* | 12/2015 | Luong | H04L 1/0003 370/329 |
| 2016/0112998 A1 | 4/2016 | Jöngren et al. | |
| 2018/0192368 A1 | 7/2018 | Chou | |
| 2019/0082354 A1* | 3/2019 | Okuyama | H04W 16/24 |
| 2019/0306791 A1 | 10/2019 | Onaka et al. | |

FOREIGN PATENT DOCUMENTS

| | | |
|---|---|---|
| CN | 102065524 A | 5/2011 |
| CN | 102186209 A | 9/2011 |
| CN | 103024880 A | 4/2013 |

OTHER PUBLICATIONS

Zhou, S. et al., "Energy efficient network planning and dynamic control for hyper-cellular network", Science China Press, Nov. 20, 2017, 17 pages.

* cited by examiner

*Primary Examiner* — Marcos Batista
(74) *Attorney, Agent, or Firm* — Slater Matsil, LLP (57) ABSTRACT

This application provides an energy saving management method and apparatus. The method includes: obtaining information about reference cells of a first cell, where the reference cells include reference cells of at least two levels, a coverage area of a first-level reference cell overlaps a coverage area of the first cell, a coverage area of a second-level reference cell overlaps the coverage area of the first-level reference cell, and the coverage area of the second-level reference cell does not overlap the coverage area of the first cell; and determining, based on the information about the reference cells, whether energy saving processing needs to be performed on the first cell.

18 Claims, 4 Drawing Sheets

ENERGY SAVING MANAGEMENT METHOD AND APPARATUS

CROSS-REFERENCE TO RELATED APPLICATIONS

This application is a continuation of International Application No. PCT/CN2019/118563, filed on Nov. 14, 2019. The disclosure of the aforementioned application is hereby incorporated by reference in its entirety.

TECHNICAL FIELD

This application relates to the field of communication, and in particular, to an energy saving management method and apparatus.

BACKGROUND

With rapid development of a wireless communication network, wireless data services provided over the network are becoming increasingly diversified, and base stations of a wireless access network (3G, 4G, and 5G) are more densely deployed, resulting in increasing energy consumption of base stations of the wireless communication network. A conventional energy saving management method for a wireless communication network includes a centralized energy saving management method and a distributed energy saving management method. In the centralized energy saving management method, a base station is directly controlled through operation, administration, and maintenance (OAM) to perform energy saving activation or deactivation. In the distributed energy saving management method, a base station autonomously determines, based on its own algorithm, to perform energy saving activation or deactivation.

In the conventional energy saving management method for a wireless communication network, an energy saving operation is performed only based on a capacity booster cell and a basic coverage cell that overlaps the capacity booster cell. In a high-density cell environment in which a 5G radio access network is deployed, when energy saving management is performed by using the conventional method, because a limited cell range is considered, energy saving management efficiency is low and implementability is poor.

Therefore, in a new high-density cell environment in which a radio access network is deployed, how to efficiently perform energy saving management is an urgent problem to be resolved at present.

SUMMARY

This application provides an energy saving management method and apparatus, to improve energy saving management efficiency.

According to a first aspect, an energy saving management method is provided, including: obtaining information about reference cells of a first cell, where the reference cells include reference cells of at least two levels, a coverage area of a first-level reference cell overlaps a coverage area of the first cell, a coverage area of a second-level reference cell overlaps the coverage area of the first-level reference cell, and the coverage area of the second-level reference cell does not overlap the coverage area of the first cell; and determining, based on the information about the reference cells, whether energy saving processing needs to be performed on the first cell.

Compared with a conventional energy saving management method, this embodiment of this application provides a region-oriented energy saving management method. When energy saving analysis is performed on a target cell (namely, the first cell), statuses of other cells (namely, the reference cells) in a region in which the target cell (namely, the first cell) is located are fully considered. Therefore, energy saving management efficiency is improved.

With reference to the first aspect, in some implementations of the first aspect, the first cell includes a capacity booster cell, and the reference cells include a basic coverage cell.

With reference to the first aspect, in some implementations of the first aspect, the reference cells include reference cells of at least N levels, where N is an integer greater than or equal to 3, a coverage area of an $N^{th}$-level reference cell overlaps a coverage area of an $(N-1)^{th}$-level reference cell, and the coverage area of the $N^{th}$-level reference cell does not overlap a coverage area of an $(N-2)^{th}$-level reference cell.

With reference to the first aspect, in some implementations of the first aspect, an $i^{th}$-level reference cell includes K reference cells, where i is an integer greater than or equal to 1, and K is an integer greater than or equal to 1. The determining, based on the information about the reference cells, whether energy saving processing needs to be performed on the first cell includes: determining M reference cells in the K reference cells, where M is an integer greater than or equal to 1 and less than or equal to K; and determining, based on information about the M reference cells, whether the energy saving processing needs to be performed on the first cell.

With reference to the first aspect, in some implementations of the first aspect, the determining M reference cells in the K reference cells includes: determining the M reference cells based on first information of the K reference cells. The first information includes at least one of the following information: historical load information, priority information, or service type information.

With reference to the first aspect, in some implementations of the first aspect, the determining, based on the information about the reference cells, whether energy saving processing needs to be performed on the first cell includes: determining, based on second information of the reference cells, whether the energy saving processing needs to be performed on the first cell. The second information includes at least one of the following information: current load information, the historical load information, the priority information, or the service type information.

With reference to the first aspect, in some implementations of the first aspect, the reference cells of the first cell are reference cells that are located in a first region and that are of the first cell. The method further includes: obtaining region indication information, where the region indication information is used to indicate the first region.

With reference to the first aspect, in some implementations of the first aspect, the method further includes: determining the reference cells of the first cell based on a geographic location and a coverage area of each cell in the first region.

With reference to the first aspect, in some implementations of the first aspect, the reference cells include reference cells of T levels, where T is an integer greater than or equal to 2. The method further includes: obtaining level indication information, where the level indication information is used to indicate a value of T.

According to a second aspect, an energy saving management apparatus is provided, including: a transceiver unit, configured to obtain information about reference cells of a first cell, where the reference cells include reference cells of at least two levels, a coverage area of a first-level reference cell overlaps a coverage area of the first cell, a coverage area of a second-level reference cell overlaps the coverage area of the first-level reference cell, and the coverage area of the second-level reference cell does not overlap the coverage area of the first cell; and a processing unit, configured to determine, based on the information about the reference cells, whether energy saving processing needs to be performed on the first cell.

With reference to the second aspect, in some implementations of the second aspect, the first cell includes a capacity booster cell, and the reference cells include a basic coverage cell.

With reference to the second aspect, in some implementations of the second aspect, the reference cells include reference cells of at least N levels, where N is an integer greater than or equal to 3, a coverage area of an $N^{th}$-level reference cell overlaps a coverage area of an $(N-1)^{th}$-level reference cell, and the coverage area of the $N^{th}$-level reference cell does not overlap a coverage area of an $(N-2)^{th}$-level reference cell.

With reference to the second aspect, in some implementations of the second aspect, $i^{th}$-level reference cells include K reference cells, where i is an integer greater than or equal to 1, and K is an integer greater than or equal to 1. Determining, based on the information about the reference cells, whether the energy saving processing needs to be performed on the first cell includes: determining M reference cells in the K reference cells, where M is an integer greater than or equal to 1 and less than or equal to K; and determining, based on information about the M reference cells, whether the energy saving processing needs to be performed on the first cell.

With reference to the second aspect, in some implementations of the second aspect, the determining M reference cells in the K reference cells includes: determining the M reference cells based on first information of the K reference cells. The first information includes at least one of the following information: historical load information, priority information, or service type information.

With reference to the second aspect, in some implementations of the second aspect, the determining, based on the information about the reference cells, whether the energy saving processing needs to be performed on the first cell includes: determining, based on second information of the reference cells, whether the energy saving processing needs to be performed on the first cell. The second information includes at least one of the following information: current load information, the historical load information, the priority information, or the service type information.

With reference to the second aspect, in some implementations of the second aspect, the reference cells of the first cell are reference cells that are located in a first region and that are of the first cell. The processing unit is further configured to perform a step of obtaining region indication information, where the region indication information is used to indicate the first region.

With reference to the second aspect, in some implementations of the second aspect, the processing unit is further configured to perform a step of determining the reference cells of the first cell based on a geographic location and a coverage area of each cell in the first region.

With reference to the second aspect, in some implementations of the second aspect, the reference cells include reference cells of T levels, where T is an integer greater than or equal to 2. The processing unit is further configured to perform a step of obtaining level indication information, where the level indication information is used to indicate a value of T.

DETAILED DESCRIPTION OF ILLUSTRATIVE EMBODIMENTS

The following describes technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) mobile communication system, or a new radio access technology (NR). The 5G mobile communication system may include non-standalone (NSA) and/or standalone (SA).

The technical solutions provided in this application may also be applied to machine type communication (MTC), a long term evolution-machine (LTE-M) technology, a device to device (D2D) network, a machine to machine (M2M) network, an Internet of Things (IoT) network, or other networks. The IoT network may include, for example, an Internet of Vehicles. Communication modes for the Internet of Vehicles system are collectively referred to as vehicle to X (vehicle to X, V2X, where X may represent anything). For example, V2X may include vehicle to vehicle (V2V) communication, vehicle to infrastructure (V2I) communication, vehicle to pedestrian (V2P) communication, or vehicle to network (V2N) communication.

The technical solutions provided in this application may be further applied to a future communication system, for example, a sixth generation mobile communication system. This is not limited in this application.

First, a region to which an energy saving management method provided in an embodiment of this application is applicable is described with reference to FIG. 1.

Figure 1:
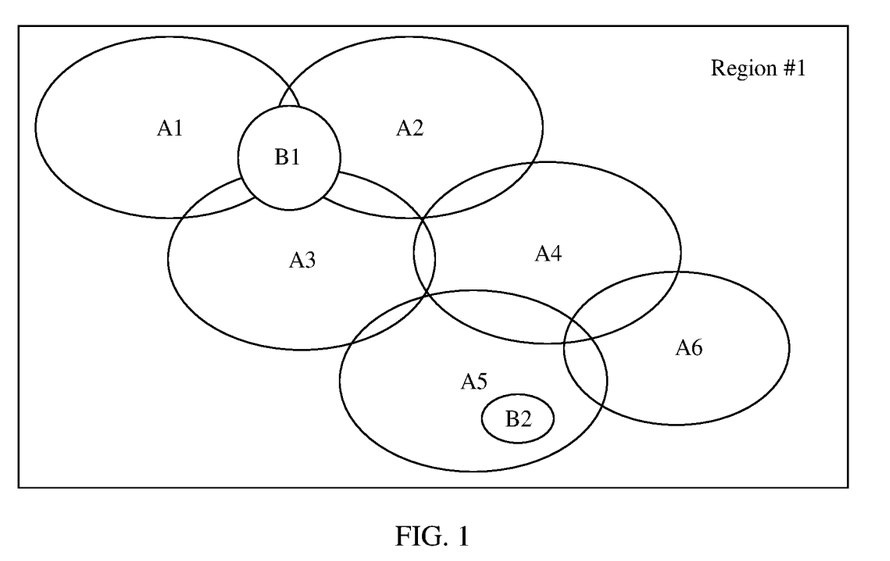
FIG. 1 is a schematic diagram of a region according to an embodiment of this application.

FIG. 1 is a schematic diagram of a region according to an embodiment of this application.

As shown in FIG. 1, a region #1 within a specific range includes capacity booster cells and basic coverage cells. A base station to which the basic coverage cells belong provides a basic network service for a cell user. A base station to which the capacity booster cells belong provides an additional hotspot service for the cell user, for example, a school VPN in a specific area. For example, the region #1 includes a capacity booster cell B1, a capacity booster cell B2, and basic coverage cells A1, A2, A3, A4, A5, and A6.

It should be understood that a quantity of capacity booster cells and a quantity of basic coverage cells included in the region #1 within a specific range are not specifically limited. For example, the region #1 may include only one capacity booster cell and a plurality of basic coverage cells. Alternatively, the region #1 may include a plurality of capacity booster cells and a plurality of basic coverage cells.

In the region #1, neighboring cell levels of a capacity booster cell are defined as follows: A coverage area of a first-level neighboring cell of the capacity booster cell overlaps a coverage area of the capacity booster cell; a coverage area of a second-level neighboring cell of the capacity booster cell overlaps the coverage area of the first-level neighboring cell of the capacity booster cell, and the coverage area of the second-level neighboring cell of the capacity booster cell does not overlap the coverage area of the capacity booster cell; and a coverage area of an $N^{th}$-level neighboring cell of the capacity booster cell overlaps a coverage area of an $(N-1)^{th}$-level neighboring cell of the capacity booster cell, where N is an integer greater than or equal to 2.

For example, when a relationship between the capacity booster cell B1 and two levels of neighboring cells of the capacity booster cell B1 is considered in the region #1, neighboring cells of the capacity booster cell B1 are A1, A2, A3, A4, and A5.

For example, when a relationship between the capacity booster cell B2 and two levels of neighboring cells of the capacity booster cell B2 is considered in the region #1, neighboring cells of the capacity booster cell B2 are A3, A4, A5 and A6.

Figure 2:
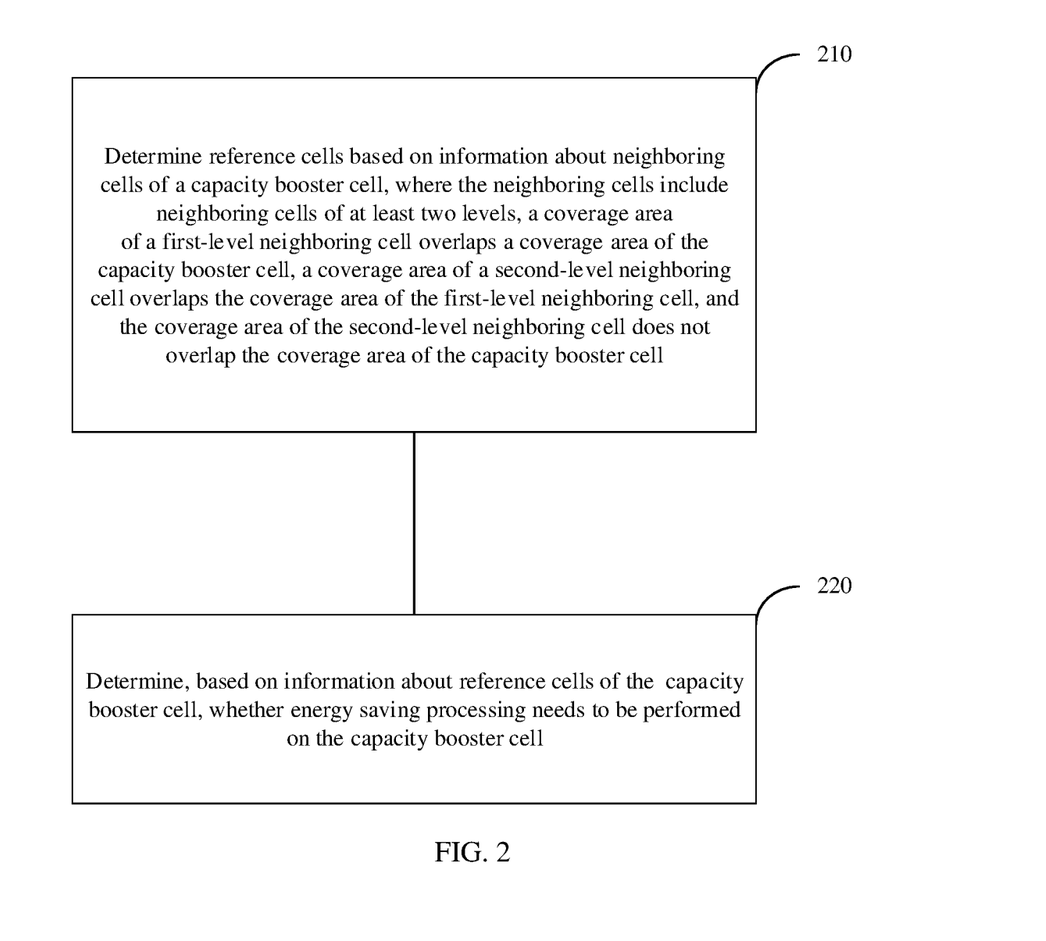
FIG. 2 is a schematic flowchart of an energy saving management method according to an embodiment of this application.

FIG. 2 is a flowchart of an energy saving management method according to an embodiment of this application.

Step 210: Determine reference cells based on information about neighboring cells of a capacity booster cell, where the neighboring cells include neighboring cells of at least two levels, a coverage area of a first-level neighboring cell overlaps a coverage area of the capacity booster cell, a coverage area of a second-level neighboring cell overlaps the coverage area of the first-level neighboring cell, and the coverage area of the second-level neighboring cell does not overlap the coverage area of the capacity booster cell.

In this embodiment of this application, the reference cells are determined based on the information about the neighboring cells of the capacity booster cell. The information about the neighboring cells of the capacity booster cell includes at least one of the following information: historical load information, priorities, or service types.

In this embodiment of this application, a factor for determining the reference cells of the capacity booster cell based on the historical load information, the priorities, or the service types of the neighboring cells of the capacity booster cell is not specifically limited. For example, when the historical load information of the neighboring cells of the capacity booster cell is low, it can be first determined that the neighboring cells are the reference cells. For example, when services of a neighboring cell are private network services, it can be first determined that the neighboring cell is a reference cell.

It should be understood that the reference cells may include all the neighboring cells of the capacity booster cell, or include only some of the neighboring cells of the capacity booster cell.

For example, in the region #1 shown in FIG. 1, considering that the neighboring cells of the capacity booster cell B1 include neighboring cells of two levels, A1, A2, and A3 are first-level neighboring cells of the capacity booster cell B1, and A5 and A4 are second-level neighboring cells of the capacity booster cell B1. That is, the neighboring cells of the capacity booster cell B1 include A1, A2, A3, A4, and A5. Based on historical load information, priorities, or service types of A1, A2, A3, A4, and A5, it may be determined that reference cells of the capacity booster cell B1 are A1, A2, A3, A4, and A5.

For example, in the region #1, considering that the neighboring cells of the capacity booster cell B2 include neighboring cells of two levels, A5 is a first-level neighboring cell of the capacity booster cell B2, and A3, A4, and A6 are second-level neighboring cells of the capacity booster cell B2. That is, the neighboring cells of the capacity booster cell B2 include A5, A3, A4, and A6. Based on historical load information, priorities, or service types of A5, A3, A4, and A6, it may be determined that a reference cell of the capacity booster cell B2 is only A5.

It should be understood that a reference cell of a capacity booster cell may be a basic coverage cell or another capacity booster cell. This not specifically limited in this application.

For example, in the region #1, considering that neighboring cells of a capacity booster cell B3 include neighboring cells of two levels, A1 and A2 are first-level neighboring cells of the capacity booster cell B3, and B2, A3, and A4 are second-level neighboring cells of the capacity booster cell B3. That is, the neighboring cells of the capacity booster cell B3 include B2, A1, A2, A3, and A4. Based on historical load information, priorities, or service types of B2, A1, A2, A3, and A4, it may be determined that reference cells of the capacity booster cell B3 are B2, A1, and A2.

In this embodiment of this application, a manner of determining the region #1 within a specific range is not specifically limited. For example, the region #1 may be determined based on region indication information. Alternatively, the region #1 may be determined by dividing a region based on a geographical location of each cell.

By way of example but not limitation, the region indication information may be specified based on a requirement of a user, or may be determined based on a network management unit.

Optionally, the neighboring cells of the capacity booster cell may further include neighboring cells of at least N levels, where N is an integer greater than or equal to 3, a coverage area of an $N^{th}$-level neighboring cell overlaps a coverage area of an $(N-1)^{th}$-level neighboring cell, and the coverage area of the $N^{th}$-level neighboring cell does not overlap a coverage area of an $(N-2)^{th}$-level neighboring cell.

Step 220: Determine, based on information about the reference cells of the capacity booster cell, whether energy saving processing needs to be performed on the capacity booster cell.

In this embodiment of this application, the information about the reference cells of the capacity booster cell includes one of the following information: current load information, historical load information, priorities, or service types.

In this embodiment of this application, a factor for determining, based on the current load information, the historical load information, the priorities, or the service types of the reference cells of the capacity booster cell, whether energy saving processing needs to be performed on the capacity booster cell is not specifically limited. For example, when the historical load information of the reference cells of the capacity booster cell is low, it may be determined that energy saving processing needs to be performed on the capacity booster cell. For example, when services of the reference cells of the capacity booster cell are private network services, it may be determined that the energy saving processing needs to be performed on the capacity booster cell. For example, when the priorities of the reference cells of the capacity booster cell are high, it may be determined that energy saving processing needs not to be performed on the capacity booster cell.

In this embodiment of this application, an energy saving management unit is configured to perform energy saving management on the capacity booster cell in the region #1. The energy saving management unit may be configured to determine the region #1 in a specific range, neighboring cell levels of the capacity booster cell in the region #1, and a load status of the capacity booster cell in the region #1. The energy saving management unit may further be configured to obtain historical load information, current load information, priorities, or service types of the neighboring cells of the capacity booster cell.

It should be understood that the energy saving management unit is not specifically limited in this embodiment of this application. For example, the energy saving management unit may be an element manager (EM), an automation engine (MAE), a management data analytic function (MDAF) module, a network slice management function (NSMF) unit, a network slice subnet management (NSSMF) unit, or a network manager (NM).

Figure 3:
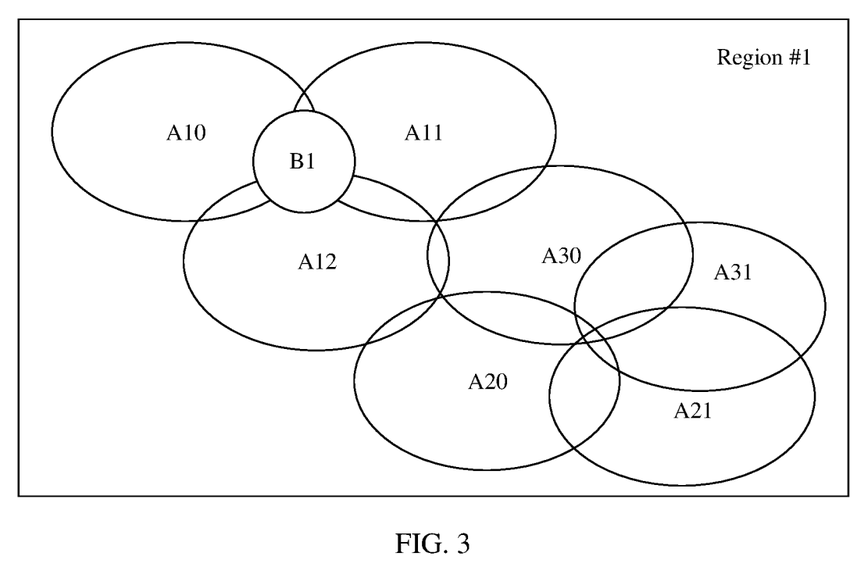
FIG. 3 is a schematic diagram of another region according to an embodiment of this application.
Figure 4:
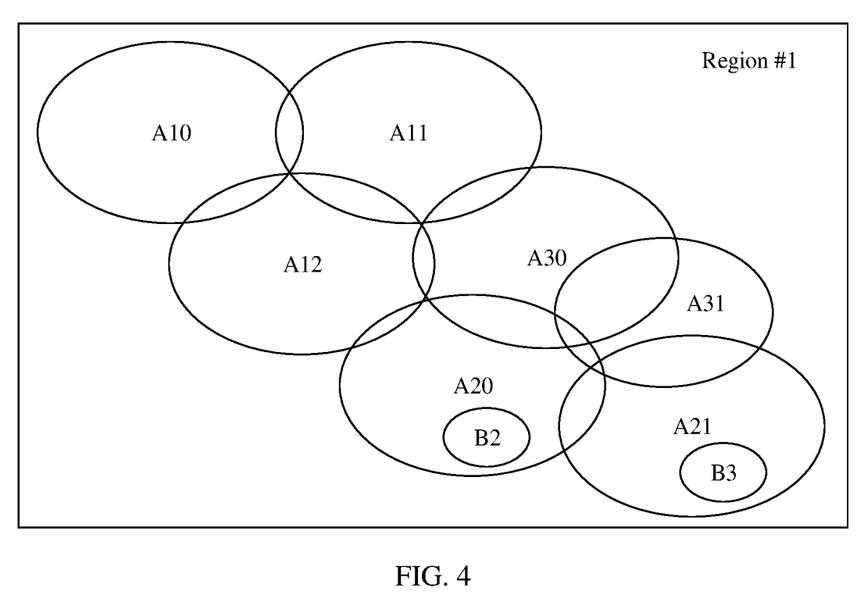
FIG. 4 is a schematic diagram of still another region according to an embodiment of this application.
Figure 5:
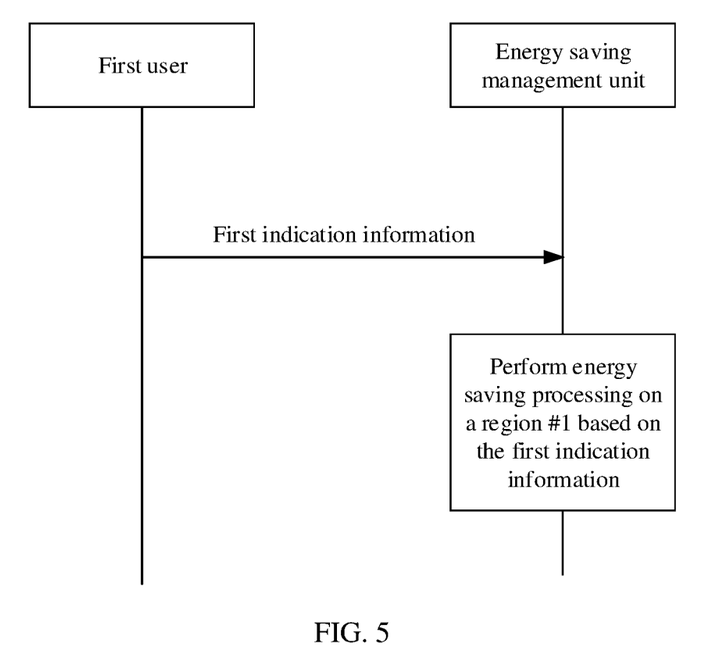
FIG. 5 is a schematic diagram of an application of an energy saving management method according to an embodiment of this application.

The following describes the energy saving management method provided in this embodiment of this application in detail with reference to FIG. 3 to FIG. 5.

FIG. 3 is a schematic diagram of another region according to an embodiment of this application.

A region #1 shown in FIG. 3 includes a capacity booster cell B1 and basic coverage cells A10, A11, A12, A20, A21, A30, and A31.

In the region #1, the capacity booster cell B1 has a relationship with one level of neighboring cells, a relationship with two levels of neighboring cells, and a relationship with three levels of neighboring cells. When reference cells of the capacity booster cell B1 are determined, the relationship with one level of neighboring cells of the capacity booster cell B1, the relationship with two levels of neighboring cells of the capacity booster cell B1, or the relationship with three levels of neighboring cells of the capacity booster cell B1 may be considered.

By way of example but not limitation, energy saving management is performed on the capacity booster cell B1 based on one level of neighboring cells of the capacity booster cell B1. In this case, neighboring cells of the capacity booster cell B1 include A10, A11, and A12. Based on historical load information, priorities, or service types of A10, A11, and A12, it may be determined that the reference cells of the capacity booster cell B1 are A10 and A12. When the capacity booster cell B1 has a low load, it is determined, based on current load information, the historical load information, the priorities, or the service types of A10 and A12, that the capacity booster cell B1 may enter an energy saving state.

It should be understood that after the capacity booster cell B1 enters the energy saving state, A10 and A12 provide network services for a user in the capacity booster cell B1.

By way of example but not limitation, energy saving management is performed on the capacity booster cell B1 based on two levels of neighboring cells of the capacity booster cell B1. In this case, the neighboring cells of the capacity booster cell B1 include A10, A11, A12, A20, and A30, where A10, A11, and A12 are first-level neighboring cells of the capacity booster cell B1, and A20 and A30 are second-level neighboring cells of the capacity booster cell B1. Based on historical load information, priorities or service types of A10, A11, A12, A30, and A20, it is determined that the reference cells of the capacity booster cell B1 may be A11, A12 and A20. When the capacity booster cell B1 has a low load, it is determined, based on current load information, the historical load information, the priorities or the service types of the reference cells A11 and A12 in the first-level neighboring cells, that the capacity booster cell B1 cannot enter the energy saving state. In this case, the reference cell A20 in the second-level neighboring cells needs to be continuously considered. When current load information or the historical load information of A20 is low, loads of A11 and A12 may be balanced by using A20, to determine that the capacity booster cell B1 can enter the energy saving state.

By way of example but not limitation, the energy saving management is performed on the capacity booster cell B1 based on three levels of neighboring cells of the capacity booster cell B1. In this case, the neighboring cells of the capacity booster cell B1 include A10, A11, A12, A20, A21, A30, and A31, where A10, A11, and A12 are the first-level neighboring cells of the capacity booster cell B1, A20 and A30 are the second-level neighboring cells of the capacity booster cell B1, and A21 and A31 are third-level neighboring cells of the capacity booster cell B1. Based on historical load information, priorities, or service types of A10, A11, A12, A20, A21, A30, and A31, it is determined that the reference cells of the capacity booster cell B1 may be A12, A20, and A31. When the capacity booster cell B1 has a low load, it is determined, based on the current load information, the historical load information, priorities, or the service types of the reference cell A12 in the first-level neighboring cells and the reference cell A20 in the second-level neighboring cells, that the capacity booster cell B1 cannot enter the energy saving state. In this case, the reference cell A31 in the third-level neighboring cells should be continuously considered. When current load information or the historical load information of A31 is low, loads of A12 and A20 may be balanced by using A31, to determine that the capacity booster cell B1 can enter the energy saving state.

Compared with a conventional energy saving management method, in the energy saving management method provided in this embodiment of this application, load statuses of all levels of neighboring cells of the capacity booster cell are fully considered. Energy saving management efficiency is improved by effectively balancing loads of all levels of neighboring cells and effectively utilizing a network resource in a region.

FIG. 4 is a schematic diagram of still another region according to an embodiment of this application.

A region #1 shown in FIG. 4 includes a capacity booster cell B2, a capacity booster cell B3, and basic coverage cells A10, A11, A12, A20, A21, A30, and A31.

In this embodiment of this application, energy saving management is performed on a capacity booster cell by taking three levels of neighboring cells of the capacity booster cell into consideration. The capacity booster cell B3 is used as an example to describe in detail the energy saving management method provided in this application.

By way of example but not limitation, in the region #1, energy saving management is performed on the capacity booster cell B3 by taking a relationship between the capacity booster cell B3 and three levels of neighboring cells of the capacity booster cell B3 into consideration. In this case, neighboring cells of the capacity booster cell B3 include B2, A12, A20, A21, A30, and A31. Based on historical load information, priorities, or service types of B2, A12, A20, A21, A30, and A31, it is determined that reference cells of the capacity booster cell B3 are B2, A20, A21, and A31. At a time T1, the capacity booster cell B3 is in a low load state and applies for entering an energy saving state. Based on historical load information of the reference cell B2, it is determined that B2 is also to be in a low load state soon. At a time T2, B2 applies for entering an energy saving state. In this case, based on the historical load information, current load information, priorities, or service types of the reference cells A20, A21, and A31, it is determined whether energy saving processing needs to be performed on the capacity booster cell B2 and the capacity booster cell B3. For example, based on the historical load information of A21, it is estimated that a load of A21 is increased at a time T3. In this case, performing energy saving processing on B2 and the capacity booster cell B3 may include one of the following cases:

1. Only B2 is allowed to enter the energy saving state, and an energy saving request of the capacity booster cell B3 is rejected;
2. Only the capacity booster cell B3 is allowed to enter the energy saving state, and in this case, A20 or A31 provides a network service for a user of a possible high load A21 at the time T3;
3. Both B2 and the capacity booster cell B3 enter the energy saving state, and in this case, A20 or A31 provides a network service for the user of the possible high load A21 at the time T3; and
4. Neither B2 nor the capacity booster cell B3 enters the energy saving state, and in this case, B2 and the capacity booster cell B3 need to provide network services for the user of the possible high load A21 at the time T3.

It should be understood that the time T3 is greater than the time T2, and the time T2 is greater than the time T1.

Compared with the conventional energy saving management method, when energy saving management is performed on a capacity booster cell according to the energy saving management method provided in this embodiment of this application, energy saving management can be performed on a region based on loads of different capacity booster cells in the region. This avoids repeated energy saving adjustments, and accordingly improves energy saving management efficiency.

FIG. 5 is a schematic diagram of an application of an energy saving management method according to an embodiment of this application.

An energy saving management unit receives first indication information sent by a first user, and performs energy saving processing on a region #1 based on the first indication information.

The first user is not specifically limited in this embodiment of this application. For example, the first user may be a software control system. Alternatively, the first user may be another management unit.

By way of example but not limitation, the first indication information may be used to determine the region #1. For example, the first indication information may be used to determine a quantity of capacity booster cells and a quantity of basic coverage cells included in the region #1. The first indication information may also be used to determine a time range in which energy saving processing is performed on the capacity booster cells in the region #1.

In this embodiment of this application, the energy saving management unit performs energy saving processing on the region #1 based on the first instruction information. A specific energy saving management method is consistent with the energy saving management method in FIG. 1 to FIG. 3. Details are not described herein again.

Figure 6:
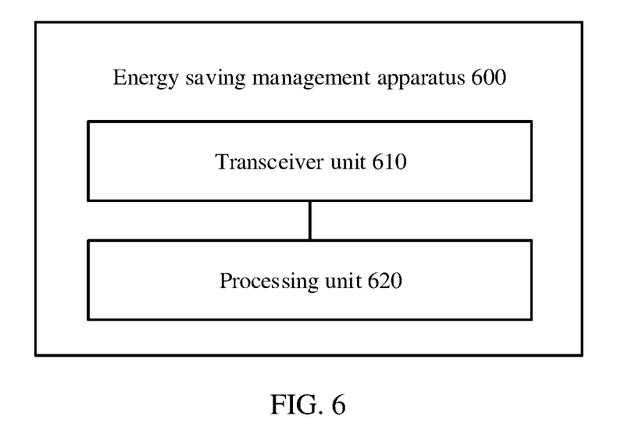
FIG. 6 is a schematic diagram of a structure of an energy saving management apparatus according to an embodiment of this application.

The following describes in detail an energy saving management apparatus provided in an embodiment of this application with reference to FIG. 6.

FIG. 6 is a schematic diagram of a structure of the energy saving management apparatus according to this embodiment of this application. The apparatus includes a transceiver unit 610 and a processing unit 620. The transceiver unit 610 is configured to obtain information about reference cells of a first cell, where the reference cells include reference cells of at least two levels, a coverage area of a first-level reference cell overlaps a coverage area of the first cell, a coverage area of a second-level reference cell overlaps the coverage area of the first-level reference cell, and the coverage area of the second-level reference cell does not overlap the coverage area of the first cell. The processing unit 620 is configured to determine, based on the information about the reference cells, whether energy saving processing needs to be performed on the first cell.

Optionally, in some embodiments, the first cell includes a capacity booster cell, and the reference cells include basic coverage cells.

Optionally, in some embodiments, the reference cells include reference cells of at least N levels, where N is an integer greater than or equal to 3, a coverage area of an $N^{th}$-level reference cell overlaps a coverage area of an $(N-1)^{th}$-level reference cell, and the coverage area of the $N^{th}$-level reference cell does not overlap a coverage area of an $(N-2)^{th}$-level reference cell.

Optionally, in some embodiments, $i^{th}$-level reference cells include K reference cells, where i is an integer greater than or equal to 1, and K is an integer greater than or equal to 1. Determining, based on the information about the reference cells, whether energy saving processing needs to be performed on the first cell includes: determining M reference cells in the K reference cells, where M is an integer greater than or equal to 1 and less than or equal to K; and determining, based on information about the M reference cells, whether energy saving processing needs to be performed on the first cell.

Optionally, in some embodiments, the determining M reference cells in the K reference cells includes: determining the M reference cells based on first information of the K reference cells. The first information includes at least one of the following information: historical load information, priority information, or service type information.

Optionally, in some embodiments, the reference cells include reference cells of at least N levels, where N is an integer greater than or equal to 3, a coverage area of an $N^{th}$-level reference cell overlaps a coverage area of an $(N-1)^{th}$-level reference cell, and the coverage area of the $N^{th}$-level reference cell does not overlap a coverage area of an $(N-2)^{th}$-level reference cell.

Optionally, in some embodiments, $i^{th}$-level reference cells include K reference cells, where i is an integer greater than or equal to 1, and K is an integer greater than or equal to 1. Determining, based on the information about the reference cells, whether energy saving processing needs to be performed on the first cell includes: determining M reference cells in the K reference cells, where M is an integer greater than or equal to 1 and less than or equal to K; and determining, based on information about the M reference cells, whether energy saving processing needs to be performed on the first cell.

Optionally, in some embodiments, the determining M reference cells in the K reference cells includes: determining the M reference cells based on first information of the K reference cells. The first information includes at least one of the following information: historical load information, priority information, or service type information.

Optionally, in some embodiments, the determining, based on the information about the reference cells, whether energy saving processing needs to be performed on the first cell includes: determining, based on second information of the reference cells, whether energy saving processing needs to be performed on the first cell. The second information includes at least one of the following information: current load information, historical load information, priority information, or service type information.

Optionally, in some embodiments, the reference cells of the first cell are reference cells that are located in a first region and that are of the first cell. The processing unit 620 is further configured to perform a step of obtaining region indication information, where the region indication information is used to indicate the first region.

Optionally, in some embodiments, the processing unit 620 is further configured to perform a step of determining the reference cells of the first cell based on a geographic location and a coverage area of each cell in the first region.

Optionally, in some embodiments, the reference cells include reference cells of T levels, where T is an integer greater than or equal to 2. The processing unit 620 is further configured to perform a step of obtaining level indication information, where the level indication information is used to indicate a value of T.

It should be noted that the apparatus in the foregoing embodiment may be a network device, a chip used in a network device, or another combination device, component, or the like that can implement a function of the network device. When the communication apparatus is a network device, the transceiver unit may be a transmitter and a receiver, or an integrated transceiver, and may include an antenna, a radio frequency circuit, and the like, and the processing unit may be a processor, for example, a baseband chip. When the apparatus is a component having a function of the foregoing network device, the transceiver unit may be a radio frequency unit, and the processing module may be a processor. When the apparatus is a chip system, the transceiver unit may be an input/output interface of the chip system, and the processing module may be a processor of the chip system, for example, a central processing unit (CPU).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    obtaining information about reference cells of a first cell, wherein the reference cells comprise reference cells of at least two levels, the reference cells of at least two levels comprise a first-level reference cell and a second-level reference cell, a coverage area of the first-level reference cell overlaps a coverage area of the first cell, a coverage area of the second-level reference cell overlaps the coverage area of the first-level reference cell, and the coverage area of the second-level reference cell does not overlap the coverage area of the first cell; and determining, based on the information about the reference cells, whether energy saving processing needs to be performed on the first cell, wherein the first cell comprises a capacity booster cell, and each of the reference cells of the first cell comprises a basic coverage cell.

2. The method according to claim 1, wherein the reference cells comprise reference cells of at least N levels, wherein N is an integer greater than or equal to 3, a coverage area of an $N^{th}$-level reference cell overlaps a coverage area of an $(N-1)^{th}$-level reference cell, and the coverage area of the $N^{th}$-level reference cell does not overlap a coverage area of an $(N-2)^{th}$-level reference cell.

3. The method according to claim 1, wherein an $i^{th}$-level reference cell of the first cell comprises K reference cells, wherein i is an integer greater than or equal to 1, and K is an integer greater than or equal to 1; and wherein determining, based on the information about the reference cells, whether energy saving processing needs to be performed on the first cell comprises:

determining M reference cells in the K reference cells, wherein M is an integer greater than or equal to 1 and less than or equal to K; and determining, based on information about the M reference cells, whether the energy saving processing needs to be performed on the first cell.

4. The method according to claim 3, wherein determining the M reference cells in the K reference cells comprises:

determining the M reference cells based on first information of the K reference cells, wherein the first information comprises at least one of the following information:

historical load information, priority information, or service type information.

5. The method according to claim 1, wherein determining, based on the information about the reference cells, whether energy saving processing needs to be performed on the first cell comprises:

determining, based on second information of the reference cells, whether the energy saving processing needs to be performed on the first cell, wherein the second information comprises at least one of the following information:

current load information, historical load information, priority information, or service type information.

6. The method according to claim 1, wherein the reference cells of the first cell are reference cells that are located in a first region of the first cell; and wherein the method further comprises:

obtaining region indication information, wherein the region indication information indicates the first region.

7. The method according to claim 6, further comprising:

determining the reference cells of the first cell based on a geographic location and a coverage area of each cell in the first region.

8. The method according to claim 1, wherein the reference cells comprise reference cells of T levels, wherein T is an integer greater than or equal to 2; and wherein the method further comprises:

obtaining level indication information, wherein the level indication information indicates a value of T.

9. The method according to claim 1, further comprising:

in response to determining that energy saving processing needs to be performed on the first cell, performing the energy saving processing on the first cell.

10. An apparatus, comprising:

a transceiver, configured to obtain information about reference cells of a first cell, wherein the reference cells comprise reference cells of at least two levels, the reference cells of at least two levels comprise first-level reference cell and a second-level reference cell, a coverage area of the first-level reference cell overlaps a coverage area of the first cell, a coverage area of the second-level reference cell overlaps the coverage area of the first-level reference cell, and the coverage area of the second-level reference cell does not overlap the coverage area of the first cell;

at least one processor; and a non-transitory memory storing program instructions that are executable by the at least one processor, the program instructions including instructions to:

determine, based on the information about the reference cells, whether energy saving processing needs to be performed on the first cell, wherein the first cell comprises a capacity booster cell, and each reference cell comprises a basic coverage cell.

11. The apparatus according to claim 10, wherein the reference cells comprise reference cells of at least N levels, wherein N is an integer greater than or equal to 3, a coverage area of an $N^{th}$-level reference cell overlaps a coverage area of an $(N-1)^{th}$-level reference cell, and the coverage area of the $N^{th}$-level reference cell does not overlap a coverage area of an $(N-2)^{th}$-level reference cell.

12. The apparatus according to claim 10, wherein an $i^{th}$-level reference cell comprises K reference cells, wherein i is an integer greater than or equal to 1, and K is an integer greater than or equal to 1; and wherein determining, based on the information about the reference cells, whether energy saving processing needs to be performed on the first cell comprises:

determining M reference cells in the K reference cells, wherein M is an integer greater than or equal to 1 and less than or equal to K; and determining, based on information about the M reference cells, whether the energy saving processing needs to be performed on the first cell.

13. The apparatus according to claim 12, wherein determining the M reference cells in the K reference cells comprises:

determining the M reference cells based on first information of the K reference cells, wherein the first information comprises at least one of the following information:

historical load information, priority information, or service type information.

14. The apparatus according to claim 10, wherein determining, based on the information about the reference cells, whether energy saving processing needs to be performed on the first cell comprises:

determining, based on second information of the reference cells, whether the energy saving processing needs to be performed on the first cell, wherein the second information comprises at least one of the following information:

current load information, historical load information, priority information, or service type information.

15. The apparatus according to claim 10, wherein the reference cells of the first cell are reference cells that are located in a first region of the first cell; and wherein the program instructions further include instructions to:
obtain region indication information, wherein the region indication information indicates the first region.

16. The apparatus according to claim 15, wherein the program instructions further include instructions to:
determine the reference cells of the first cell based on a geographic location and a coverage area of each cell in the first region.

17. The apparatus according to claim 10, wherein the reference cells comprise reference cells of T levels, wherein T is an integer greater than or equal to 2; and
wherein the program instructions further include instructions to:
obtain level indication information, wherein the level indication information indicates a value of T.

18. The apparatus according to claim 10, wherein the program instructions further include instructions to:
in response to determining that energy saving processing needs to be performed on the first cell, performing the energy saving processing on the first cell.

* * * * *